Nov. 19, 1963 E. GOSTYN 3,111,638

INTERLEAVED LAYER WINDING

Filed Nov. 21, 1961

INVENTOR.
ERNEST GOSTYN

BY James and Franklin

ATTORNEYS

3,111,638
INTERLEAVED LAYER WINDING

Ernest Gostyn, Longmeadow, Mass., assignor to General Instrument Corporation, Newark, N.J., a corporation of New Jersey Filed Nov. 21, 1961, Ser. No. 153,903
10 Claims. (Cl. 336—183)

The present invention relates to a multi-layered coil so wound as to minimize or prevent the occurrence of undesired oscillatory currents therein.

Because adjacent turns of a coil are capacitively connected to one another across the span between them, as well as inductively connected along the length of the winding, partial circuits are defined through which oscillatory currents may flow if suitable external stimulation is present. This stimulation may come from the current flowing within the coil itself, or from external currents. The problem is particularly acute in connection with toroidal deflection yokes used in cathode ray tube deflection yoke assemblies, those yokes comprising a plurality of coils in which those coils belonging to at least one deflection system are wound on an essentially closed ferromagnetic core. The windings or sets of windings of different deflection systems are energized by different signals, and in most instances the flux from both systems passes through portions of that closed core.

Systems of display of this type, which are based upon magnetic deflection, utilize deflection current wave forms of appreciable complexity. As a result, the harmonic components of the current in a given coil are present in sufficient strength to excite the partial oscillatory circuits defined in that given coil by the adjacent turns above referred to, the oscillatory paths comprising inductive sections of the winding in conjunction with capacitive components originating in the distributed capacity of the winding.

Because the ferromagnetic core about which a given coil is wound in a television display is often magnetically common to more than one deflection system, each deflection system utilizing fields of different wave forms and different fundamental frequencies, undesired oscillations in a given coil can arise not only from the harmonics of the deflection current passing through that coil, but also from electromagnetic linking with the deflection current with which the other coil is energized. The magnitude of this problem can be appreciated when it is considered that in a television tube display frequency ratios of the order of over 200:1 may exist, and portions of a low frequency winding might readily be excited by high frequency energy components.

If oscillations of the type described are permitted to exist, they will interfere with the field of the deflection current proper and cause deflection distortion. Such distortion must be minimized or eliminated if acceptable picture quality is to be achieved.

Various approaches have been tried in the past to eliminate or minimize these problems, among which may be mentioned the use of very low inductance windings, the use of low distributed capacity windings, and the application of heavy resistive damping. These approaches either limit design flexibility, interfere with efficient deflection, or provide very limited suppression of undesired oscillations. Another suggestion has been to wind each layer of the coil in the same axial direction. This involves a quick return of the wire after the winding of one layer has been completed and before the winding of the second layer commences, so that the second layer may then be wound in the same axial direction as the first layer. This involves production problems—it is difficult to accomplish the rapid return without placing such strain upon the wire as to tend to sever it, electrical problems— the return wire, in crossing over all of the turns of the completed layer, produces electrical interactions which complicate design, and physical problems—there is a tendency for the thickness of the coil to build up too rapidly because of the crossing over of the return wire.

It is the prime object of the present invention to minimize undesired oscillations in windings of the type under discussion in an efficient and effective manner which is susceptible of ready production use with conventional equipment and without any of the additional complications presented by prior art approaches to this problem. More specifically, the windings are so arranged as to prevent the occurrence of undesired oscillation, and that arrangement is achieved by winding the wire alternately in opposite axial directions but without building up the thickness of the coil excessively or adding electrical complications to the overall circuit.

In accordance with the present invention each layer of the winding is formed of two sets of turns, the first set being wound in one axial direction with spaces between some of the turns thereof, and preferably between each turn thereof, the second set of turns of that layer being laid on in the opposite axial direction and in the spaces between the turns of the first set. Subsequent layers are similarly wound (although not necessarily with the same number of turns). Since the winding proceeds alternately, and preferably similarly, in opposite axial directions, conventional winding equipment may be used, and with uniform stress on the wire as it is being wound. Nevertheless the end result is electrically such as to prevent the undesired oscillations within the winding from occurring.

To the accomplishment of the above, and to such other objects as may hereinafter appear, the present invention relates to the coil arrangement as defined in the appended claims and as described in this specification, taken together with the accompanying drawings, in which:

FIG. 1 is a semi-schematic three-quarter perspective view of a typical television tube deflection yoke assembly in which one set of windings is wound about a toroidal magnetic core, the other set of windings being located inside that core, each of the windings being of the multi-layer type, this illustration schematically indicating a type of situation where electromagnetic interaction between the windings tends to cause undesired oscillations within one or another of the windings;

Figures 1, 2, 3, 4, 5:
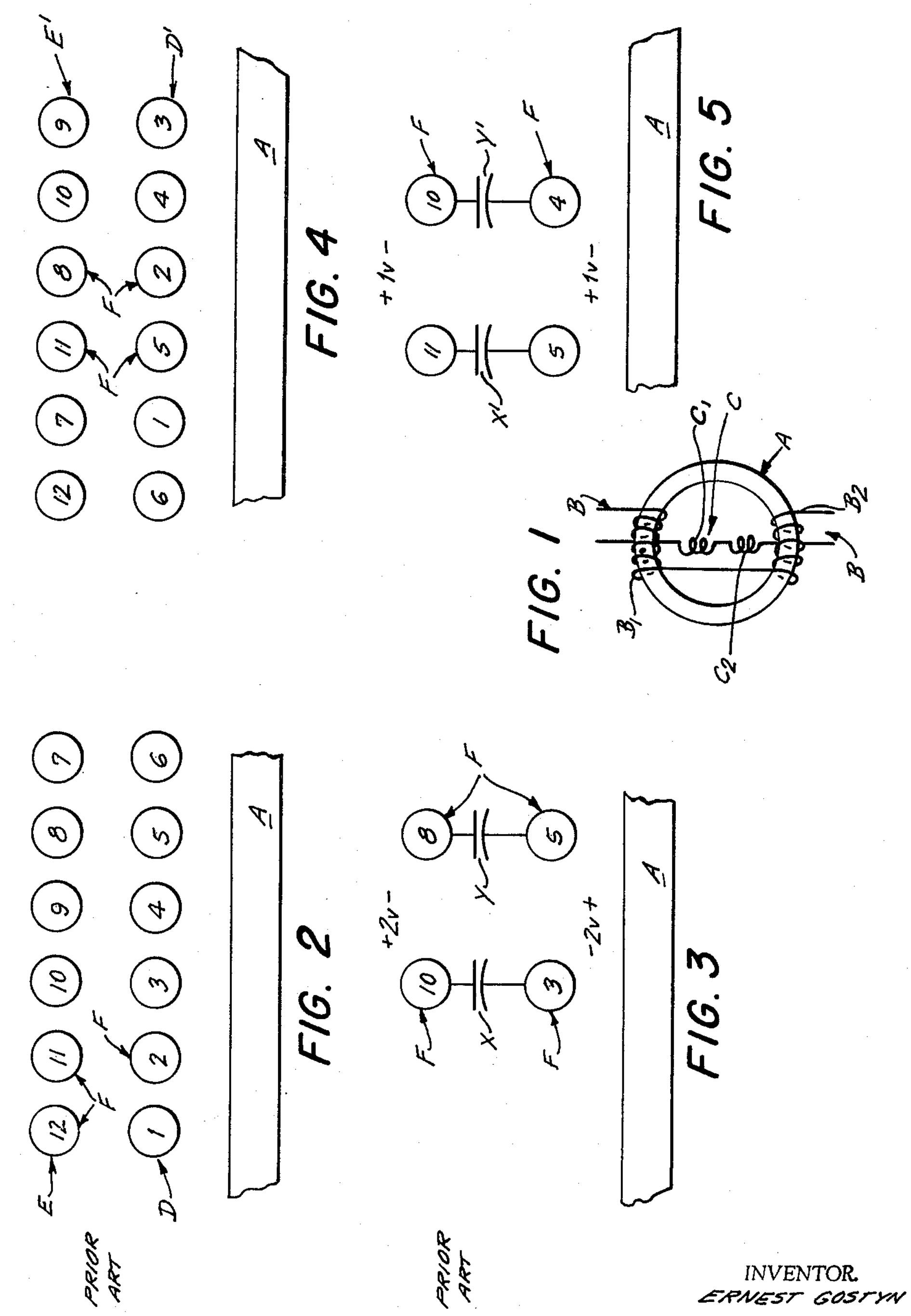
FIG. 2 is a schematic view of a plurality of turns of a prior art two-layer winding on a core, the turns being laid on in conventional fashion, one layer being completely wound in one axial direction and the next layer being completely wound in the other axial direction.
FIG. 3 is a view similar to FIG. 2 but showing how a partial oscillatory circuit is produced in connection with selected turns of the prior art winding of FIG. 2.
FIG. 4 is a view similar to FIG. 2 but indicating the sequence in which the turns are wound in accordance with the present invention.
FIG. 5 is a view similar to FIG. 3 demonstrating the manner in which the winding arrangement of the present invention prevents oscillations.

First making general reference to FIG. 1, a torodial ferromagnetic core A is there disclosed. A winding generally designated B is formed on the core A in a pair of sections $B_1$ and $B_2$, each of those sections being formed of a plurality of layers of serially conductive connected turns arranged in flux opposing relationship. Located inside the core A is another winding generally designated C and formed of sections $C_1$ and $C_2$ which are serially conductively connected in flux aiding relationship, the winding C being separately and independently energized. The return flux in the field derived from winding C passes through the core A, and thus electromagnetically interacts with winding B. When the energization of either of the windings B or C is of a complex nature, the harmonics of the energizing current will tend to induce currents corresponding thereto in portions of that winding having the appropriate electrical parameters. Also, because of the linking effect of the magnetic core A through which the flux produced by both sets of windings B and C passes, each winding B and C will tend to be affected by the currents in the other winding C or B respectively, with a further tendency for undesired oscillations to take place.

The manner in which multi-layer windings of the type under discussion tend to form circuits within which such oscillations can occur is illustrated in FIGS. 2 and 3, which schematically represent a conventional type of multi-layer winding. Each winding is composed of a plurality of turns arranged in superposed layers. For purposes of illustration in FIG. 2 there is shown a magnetic core A on which is wound a winding having an inner layer D and an outer layer E each composed of six turns. The turns of the inner layer D are wound consecutively from left to right as viewed in FIG. 2, and then the turns of the outer layer E are laid on from right to left. Each of the turns is schematically represented by a circle designated F, the numbers inside the circles representing the order or sequence in which they are wound.

The actual excitation voltage applied to each individual turn F (whether derived from an external signal or from electromagnetic inductive effects) will differ at any given instant, those turns closer to the high voltage terminal having the higher voltage applied thereto. For purposes of simplicity of analysis it will be assumed that the numbers assigned to the individual turns F also represent the actual instantaneous A.C. excitation voltages applied thereto.

In addition to the conductive and inductive connection between the various turns F, there is also a capacitive relationship between adjacent turns, and particularly between adjacent turns in different layers. In FIG. 3 this distributed capacitance between the turns 3 and 10 is represented by the capacitor X and the distributed capacitance between turns 5 and 8 is represented by the capacitor Y. An examination of the system defined by the turns 3, 5, 8 and 10 in this conventional method of winding reveals that there is a potential difference of two volts between turns 3 and 5 and a potential difference of two volts between turns 8 and 10, those two potential differences acting in an aiding manner between turns 3 and 5 and turns 8 and 10 respectively. This results in an overall voltage of four volts available for driving excitation of the partial, oscillatory circuit formed by the inductances between turns 8 and 10 and turns 3 and 5 and the capacitances X and Y. Further analysis will disclose that no matter which two pairs of adjacent windings on layers D and E are selected, the same results obtain, and the further one extends the system, the greater are the driving voltages available to excite the partial, oscillatory circuits.

In accordance with the present invention, and as schematically disclosed in FIG. 4, a winding is produced formed of an inner layer D′ and an outer layer E′ each composed of six turns, the turns being represented schematically by circles designated F and the order in which the turns are laid on being indicated by the numbers within those circles, all similarly to the manner of representation utilized in FIG 2. In accordance with the present invention the turns are laid on as follows: Turns 1, 2 and 3 are wound axially from left to right as viewed in FIG. 4 with spaces between them. Turns 4, 5 and 6 are then wound from right to left, turns 4 and 5 being laid into the spaces between turns 3—2 and 2—1 respectively and turn 6 being wound to the left of turn 1. The outer layer E′ is then wound in a similar manner, turns 7, 8 and 9 corresponding to and generally overlying turns 1, 2 and 3 of the inner layer D′ and turns 10, 11 and 12 corresponding to and overlying turns 4, 5 and 6 of the inner layer D′.

FIG. 5 represents an analysis of the partial oscillatory circuit produced between two pairs of windings on the inner and outer layers D′ and E′ respectively located in the same relative positions as the windings utilized in connection with FIG. 3. The distributed capacitance between windings 5 and 11 is represented by the capacitor X′ and the distributed capacitance between windings 4 and 10 is represented by the capacitor Y′. The potential differences between the windings 4 and 5 and the windings 10 and 11 are in this instance equal (1 volt) and opposed to one another insofar as a partial oscillatory circuit comprising the inductances between 10—11 and 4—5 and the capacitances X′ and Y′ are concerned. Because these potential differences are opposed to one another there will, within the circuit illustrated in FIG. 5, be no effective driving voltage, and consequently no partial oscillatory effects will take place. Further analysis discloses that no matter which two pairs of adjacent windings on the inner and outer layers D′ and E′ are concerned, the same result obtains—the potential differences oppose one another and thus prevent undesired oscillations.

Since, in the system of FIGS. 4 and 5, all of the turns are wound in the same circumferential sense, this winding acts magnetically in precisely the same fashion as the conventional winding shown in FIG. 2 insofar as the core A upon which it is wound is concerned. Hence the same deflection effects, both as to magnitude and distribution, can be obtained with coils of the teachings of the prior art. Since the windings are applied in accordance with the present invention first in one axial direction and then in the other, and substantially uniformly both ways, conventional winding equipment may be employed and substantially uniform strain is placed on the wire during the winding thereof. Since crossovers are distributed over the length of the layer, undesired circuit complications are negligible and the thickness of the winding is not deleteriously affected. The practice of the present invention does not adversely affect flexibility of circuit design nor efficiency of deflection, yet partial oscillations are very substantially reduced and in many cases entirely eliminated.

The disclosure here in FIGS. 4 and 5 is but exemplary of the many different ways in which the method of the present invention could be carried out. Obviously, each layer could consist of as many turns as desired, the number of layers could be increased, and the number of turns in each layer need not be the same. While it is preferred that a space be provided between each sequentially adjacent pair of turns, such as 1—2, 2—3, etc., within each of which spaces a single turn laid on in the opposite axial direction (turns 5 and 4 respectively in FIG. 4) is adapted to be received, the beneficial effects of the teachings of the present invention could be obtained to a greater or lesser extent by using different arrangements—for example, a space could be provided between each two turns, within which one or two turns laid on in the opposite axial direction are adapted to be received, or the arrangement could be non-uniform, with spaces of different sizes between different groups of turns. The teachings of the present invention permit a wide latitude in the manner in which the winding is carried out, thus permitting the present invention to be used in many different types of electrical environments. By forming layers from a pair of interleaved sets of turns, the first set being wound in a given axial direction and the second set being interleavingly wound in the opposite axial direction, the electrical relationship between the turns of adjacent layers connected to one another by distributed capacitance is so controlled as to minimize or eliminate undesired oscillations within the windings.

While but a single embodiment of the present inventioin has been here disclosed, it will be apparent that many variations may be made therein, all within the scope of the instant invention as defined in the following claims.

I claim:

1. In a multi-layered multi-turn coil having inner and outer layers of turns, the improvement which comprises a first set of turns of an inner layer wound in a given axial direction with spaces between some of said turns, a succeeding second set of turns of said inner layer being wound in the opposite axial direction and received in said spaces between turns of said first set, a succeeding third set of turns forming part of an outer layer being wound similarly to said first set of turns, and a succeeding fourth set of turns forming part of said outer layer being wound similarly to said second set of turns and received in the spaces between the turns of said third set, said sets of turns being serially connected in order and wound in the same circumferential sense.

2. In a multi-layered multi-turn coil having inner and outer layers of turns, the improvement which comprises a first set of turns of an inner layer wound in a given axial direction with spaces between some of said turns, a succeeding second set of turns of said inner layer being wound in the opposite axial direction and received in said spaces between turns of said first set, a succeeding third set of turns forming part of an outer layer being wound similarly to and overlying said first set of turns, and a succeeding fourth set of turns forming part of said outer layer being wound similarly to and overlying said second set of turns and received in the spaces between the turns of said third set, said sets of turns being serially connected in order and wound in the same circumferential sense.

3. In a multi-layered multi-turn coil having inner and outer layers of turns, the improvement which comprises a first set of turns of an inner layer wound in a given axial direction with spaces between successive turns, a succeeding second set of turns of said inner layer being wound in the opposite axial direction and with each successive turn received in said corresponding successive spaces between successive turns of said first set, a succeeding third set of turns forming part of an outer layer being wound similarly to said first set of turns, and a succeeding fourth set of turns forming part of said outer layer being wound similarly to said second set of turns and received in the spaces between the turns of said third set, said sets of turns being serially connected in order and wound in the same circumferential sense.

4. In a multi-layered multi-turn coil having inner and outer layers of turns, the improvement which comprises a first set of turns of an inner layer wound in a given axial direction with spaces between successive turns, a succeeding second set of turns of said inner layer being wound in the opposite axial direction and with each successive turn received in said corresponding successive spaces between successive turns of said first set, a succeeding third set of turns forming part of an outer layer being wound similarly to and overlying said first set of turns, and a succeeding fourth set of turns forming part of said outer layer being wound similarly to and overlying said second set of turns and received in the spaces between the turns of said third set, said sets of turns being serially connected in order and wound in the same circumferential sense.

5. A coil comprising a plurality of turns forming inner and outer layers, the turns of said inner layer comprising a first set of turns wound in one direction axially of said coil with spaces between selected turns and a succeeding second set of turns wound in the opposite axial direction and received in said spaces between said selected turns of said first set, the turns of said outer layer comprising third and fourth sets of turns wound similarly to the corresponding turns of said first and second sets of turns respectively, said turns being serially connected in order, all of said turns of a given layer being wound in the same circumferential direction.

6. A coil comprising a plurality of turns forming inner and outer layers, the turns of said inner layer comprising a first set of turns wound in one direction axially of said coil with spaces between selected turns and a succeeding second set of turns wound in the opposite axial direction and received in said spaces between said selected turns of said first set, the turns of said outer layer comprising third and fourth sets of turns wound similarly to and overlying the corresponding turns of said first and second sets of turns respectively, said turns being serially connected in order, all of said turns of a given layer being wound in the same circumferential direction.

7. A coil comprising a plurality of turns forming inner and outer layers, the turns of said inner layer comprising a first set of turns wound in one direction axially of said coil with spaces between successive turns and a succeeding second set of turns wound in the opposite axial direction and successive turns thereof being received in said spaces between said successive turns of said first set, the turns of said outer layer comprising third and fourth sets of turns wound similarly to the corresponding turns of said first and second sets of turns respectively, said turns being serially connected in order, all of said turns of a given layer being wound in the same circumferential direction.

8. A coil comprising a plurality of turns forming inner and outer layers, the turns of said inner layer comprising a first set of turns wound in one direction axially of said coil with spaces between successive turns and a succeeding second set of turns wound in the opposite axial direction and successive turns thereof being received in said spaces between said successive turns of said first set, the turns of said outer layer comprising third and fourth sets of turns wound similarly to and overlying the corresponding turns of said first and second sets of turns respectively, said turns being serially connected in order, all of said turns of a given layer being wound in the same circumferential direction.

9. A toroidal coil comprising a substantially closed magnetic core and a pair of windings wound thereabout, each of said windings comprising radially inner and outer layers of turns comprising a first set of turns of an inner layer wound in a given axial direction with spaces between some of said turns, a succeeding second set of turns of said inner layer being wound in the opposite axial direction and received in said spaces between turns of said first set, a succeeding third set of turns forming part of an outer layer being wound similarly to said first set of turns, and a succeeding fourth set of turns forming part of said outer layer being wound similarly to said second set of turns and received in the spaces between the turns of said third set, said sets of turns being serially connected in order and wound in the same circumferential sense.

10. A torodial coil comprising a substantially closed magnetic core and a pair of windings wound thereabout, each of said windings comprising radially inner and outer layers of turns comprising a first set of turns of an inner layer wound in a given axial direction with spaces between successive turns, a succeeding second set of turns of said inner layer being wound in the opposite axial direction and with each successive turn received in said corresponding successive spaces between successive turns of said first set, a succeeding third set of turns forming part of an outer layer being wound similarly to and overlying said first set of turns, and a succeeding fourth set of turns forming part of said outer layer being wound similarly to and overlying said second set of turns and received in the spaces between the turns of said third set, said sets of turns being serially connected in order and wound in the same circumferential sense.

References Cited in the file of this patent

UNITED STATES PATENTS

| | | |
|---|---|---|
| 1,653,951 | Featherston | Dec. 27, 1927 |
| 2,836,803 | White et al. | May 27, 1958 |
| 3,061,804 | Bereskin | Oct. 30, 1962 |